United States Patent
Orsolini et al.

(10) Patent No.: US 9,165,281 B2
(45) Date of Patent: Oct. 20, 2015

(54) SYSTEM AND METHOD FOR ENABLING ELECTRONIC PRESENTATIONS

(75) Inventors: Garry Orsolini, Fair Oaks, CA (US); Kevin Hutler, Foresthill, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3199 days.

(21) Appl. No.: 11/147,770

(22) Filed: Jun. 7, 2005

(65) Prior Publication Data
US 2006/0277255 A1 Dec. 7, 2006

(51) Int. Cl.
G06Q 10/10 (2012.01)
(52) U.S. Cl.
CPC .................................. G06Q 10/10 (2013.01)
(58) Field of Classification Search
CPC .................................................. G06Q 10/10
USPC ........................... 709/204–205; 715/200, 255
See application file for complete search history.

(56) References Cited

U.S. PATENT DOCUMENTS

| | | | |
|---|---|---|---|
| 5,392,400 A * | 2/1995 | Berkowitz et al. | 709/203 |
| 6,404,441 B1 * | 6/2002 | Chailleux | 715/704 |
| 6,601,087 B1 * | 7/2003 | Zhu et al. | 709/205 |
| 2002/0038346 A1 * | 3/2002 | Morrison et al. | 709/205 |
| 2003/0225832 A1 * | 12/2003 | Ludwig | 709/204 |
| 2004/0003042 A1 * | 1/2004 | Horvitz et al. | 709/204 |
| 2004/0098462 A1 * | 5/2004 | Horvitz et al. | 709/207 |
| 2004/0153969 A1 * | 8/2004 | Rhodes | 715/515 |
| 2005/0021624 A1 * | 1/2005 | Herf et al. | 709/204 |
| 2005/0262201 A1 * | 11/2005 | Rudolph et al. | 709/205 |
| 2006/0031235 A1 * | 2/2006 | Foresti et al. | 707/100 |
| 2006/0036958 A1 * | 2/2006 | Dreher | 715/764 |
| 2006/0075054 A1 * | 4/2006 | Zhang et al. | 709/206 |
| 2006/0075348 A1 * | 4/2006 | Xu et al. | 715/730 |
| 2006/0154227 A1 * | 7/2006 | Rossi et al. | 434/350 |
| 2007/0094467 A1 * | 4/2007 | Yamasaki | 711/162 |
| 2008/0282160 A1 * | 11/2008 | Tonnison et al. | 715/704 |
| 2010/0268691 A1 * | 10/2010 | Grinstein et al. | 707/682 |

OTHER PUBLICATIONS

TechSmith. TechSmith's Web pages for the Snaglt product Line. [6 pages retreived from eDAN on May 30, 2009] Dec. 24, 2003. <URL: http://web.archive.org/web/20031204205447/www.techsmith.com/products/snagit>.*

TechSmith. "SnagIt: Getting Started Guide." Retrieved form the Internet on Jul. 30, 2010. <URL:http://download.techsmith.com/snagit/docs/gettingstarted/enu/SnagIt%207.2%20Getting%20Started%20Guide.pdf>.*

(Continued)

*Primary Examiner* — Larry Donaghue
(74) *Attorney, Agent, or Firm* — Thorpe North & Western, LLP (57) ABSTRACT

A system and method is provided for enabling collaborative electronic presentations and annotation of graphic information. The method includes the operation of taking a snapshot of an active application. A snapshot can be initiated by a user accessible snapshot control. The snapshot of the active application can be transferred to the electronic whiteboard in response to activation of the snapshot control. A further operation is storing the snapshot in a whiteboard sheet of the electronic whiteboard. Each loaded snapshot may be stored in a separate whiteboard sheet in order to provide a plurality of whiteboard sheets. Another operation can be enabling graphical annotation of the plurality of whiteboard sheets in the whiteboard annotation area by the user.

21 Claims, 7 Drawing Sheets

(56) References Cited

OTHER PUBLICATIONS

TechSmith. "SnagIt: User'sGuide." Retrieved form the Internet on Jul. 30, 2010. <URL:http://doclib.sbccd.net/Files/District/District_Computing_Services/Documentation-DCS/Techsmith%20Manuals/SnagItUserGuide.pdf>.*

TechSmith. TechSmith's Web pages for the SnagIt product Line. [6 pages retreived from eDAN on May 30, 2009] Dec. 24, 2003. <URL: http://web.archive.org/web/20031204205447/www.techsmith.com/products/snagit>.*

Stallings, William. "Operating Systems Internals and Design Principals Fourth Edition." (C) 2001 by Pretence-Hall Inc.*

* cited by examiner

SYSTEM AND METHOD FOR ENABLING ELECTRONIC PRESENTATIONS

BACKGROUND

Electronic collaboration and conferencing tools allow individuals in many locations to share desktop display and content. These collaboration and conferencing tools enable users to present and share slides, applications, files or the user's desktop to a large (or small) group of people in real-time using a web browser or networked application. Using networked conferencing as a meeting alternative or to enrich face-to-face meetings is quickly becoming a part of business communications.

Such virtual collaboration tools can reduce the amount of time people spend traveling to and from meetings. Although meetings are an essential part of business, meetings can take up the majority of time in the average business person's day. When meetings are more productive, this can enhance the business value of the meetings.

Scheduled or ad-hoc electronic meetings can reduce costs and increase productivity. Electronic sharing tools encourage collaboration, expedite decision-making and enhance interactions with customers, partners, and colleagues. In addition, software under development or products can be demonstrated to anyone quickly without significant expense. For example, virtual collaboration can allow users to show electronic slideshows, demonstrate product features, show videos, and review documentation.

Virtual collaboration environments enable users to provide a number of valuable functions due to the nature of electronic sharing. For example, users can jointly view, annotate, or edit word processing documents in real time. Users can collaborate on presentation material and communicate without the expense of traveling. In addition, users of conferencing systems can deliver high quality, time-critical training without generally worrying about hardware or software issues.

When electronic desktop and application sharing meetings take place, the users may desire to use an electronic whiteboard in the presentation. This allows all the meeting participants to draw or make notes using the whiteboard. In addition, images that are displayed on the whiteboard can be annotated upon.

Another function of collaboration and conferencing tools is the ability to share and transmit a live shared application to participants of a conference. For example, software developers may demonstrate a beta version of their product for customers to allow them to see the current version and provide feedback to the development team. Collaboration tools allow meeting participants to see the live shared application actually running on the presenter's desktop while the presenter is using, demonstrating, and discussing the shared application.

Unfortunately, switching between shared live applications and whiteboard annotation during virtual collaboration meetings or electronic learning sessions is rather difficult. Not only can it be difficult to switch between live content and whiteboard content but the complexity of switching back and forth can interrupt the flow of the presentation or interaction. With many types of collaboration tools, this type of switching is not even possible and it is overly difficult in others.

One difficulty in moving back and forth between a live shared application and a whiteboard is that collaboration tools allow users to run application sharing or use the snapshot tool but these two tools cannot generally be run simultaneously. Particularly, a user of a collaboration tool will have to stop live application sharing in order to use other functions in a collaboration tool. This also means that the participants receiving the shared application will not see the shared application from the presenter during a time period where another collaboration function is being used. For example, the live application sharing pane may turn black when another function is used.

Stopping the application sharing tool allows the presenter to switch to a snapshot tool and take a snapshot of the live application while the application is not being shared. The snapshot may then be opened in a whiteboard tool and the participants of the presentation can make whiteboard annotations. Finally, when the presenter wants to demonstrate the live application again, then the live application sharing is restarted by the presenter. All of these steps may take several minutes and severely interrupt the flow of the presentation.

If a presenter wants to reduce the time it takes to load an application snapshot into a whiteboard, then the presenter may save images to a storage location or hard drive in advance. Then the users can load the saved images into the whiteboard for annotation. This method usually means that the users prepare information before a conference and then drag and drop or open the graphics files into the whiteboard during a meeting. This process can be relatively burdensome and the pre-created snapshots may not exactly match up with what ends up being presented in the live demonstration. Moreover, the application sharing functions still have to be shut down to use the whiteboard functions using this approach.

DETAILED DESCRIPTION OF EXAMPLE EMBODIMENT(S)

Figure 1:
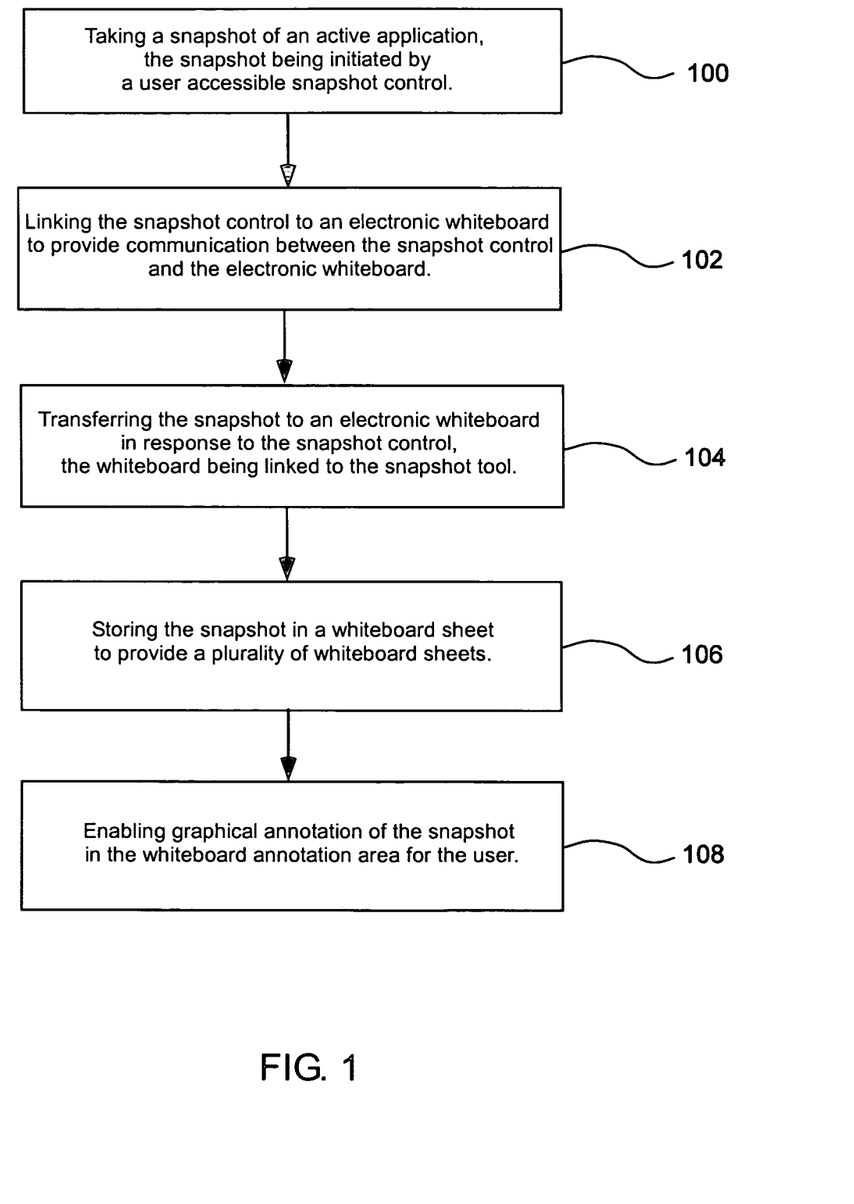
FIG. 1 is a flow chart illustrating a method for enabling collaborative electronic presentations in accordance with an embodiment.

A system and method is provided for enabling collaborative electronic presentations. One embodiment of a method is illustrated in FIG. 1. The method can include the operation of taking a snapshot of an active application as in block 100. The snapshot can be initiated by a snapshot control accessible to the user. The user can access this snapshot control or button while the user is presenting or using an active application. An active application is generally defined here as an application or active display content that is being executed, shared, displayed, or demonstrated by an electronic presenter. The snapshot button can be separately contained within a window or toolbar on the user's desktop. For example, the snapshot button can be part of an electronic presentation or collaboration application.

Another optional operation of the method is linking the snapshot control to an electronic whiteboard to provide communication between the snapshot control and the electronic whiteboard as in block 102. This linking can be created using a pre-compiled program link or a dynamic link created using an object linking framework provided in the operating system (e.g. object automation containers).

Once the snapshot has been captured and the appropriate link to the whiteboard has been created or provided, then the snapshot of the active application can be transferred to an electronic whiteboard as in block 104. This transfer of the snapshots is in response to the activation of a snapshot control. Since the electronic whiteboard may be linked with the snapshot control, then the whiteboard can receive a snapshot from the snapshot control after the snapshot is taken. For example, a user may be demonstrating an active or "live" application and a snapshot can be taken of that active application. Alternatively, a snapshot of the user's desktop or other user interface area can be taken.

Another operation that can occur when the snapshot button is activated by a user is the snapshot can be stored in a whiteboard sheet of the electronic whiteboard, as in block 106. In particular, each loaded snapshot may be stored in a separate whiteboard sheet in order to provide a plurality of whiteboard sheets. This provides a number of whiteboard sheets with the snapshots and the whiteboard sheets can be navigated through in a sequential manner. For example, the user can move forward or back through the whiteboards sheets using navigation buttons to view annotations. Alternatively, the whiteboard sheets can be navigated by requesting a specific sheet number that a user desires to view.

When the snapshot button is activated by a user, the whiteboard can be launched and moved to a foreground of the user interface for use by the user. The foreground can be considered a topmost window with the user interface focus or any location where the user can directly access the whiteboard. The whiteboard may be brought into the user's focus automatically as a result of taking the individual snapshot. The snapshot for the current whiteboard sheet can then be displayed in a whiteboard annotation area in response to the snapshot control activation.

The snapshot can be graphically annotated upon by the user in the whiteboard annotation area as in block 108. The whiteboard annotation area can include tools that allow either the presenter or participants in the electronic presentation audience to make direct annotations to the snapshot without moving or dragging images into the whiteboard. The annotation tools in the whiteboard may include freehand writing tools, text tools, geometric object tools and similar graphic drawing functions.

One embodiment provides a seamless transition from demonstrating an active application to the annotation by the user of the snapshots of the active application. This allows a presenter to concentrate on making the presentation of the active content or demonstrated application, and users can avoid struggling with previously saved snapshots and transferring those snapshots to a whiteboard application that is not integrated with the active application sharing tool.

Previously, a user prepared snapshots for a presentation in advance and then moved the snapshots over into the annotation tool. Loading these snapshots took many clicks of a mouse or many keystrokes. Creating a snapshot of an active application, then saving the snapshot and reopening the snapshot in the whiteboard can also be difficult or time consuming. Because the previous methods of using a snapshot with a whiteboard takes multiple user interface actions, users have not desired to annotate images during the presentation of active applications or other live content. In addition, the annotation process was previously so complicated that it interfered with the presentation flow and the presenter's mental train of thought.

Generally speaking, presentation flow has been considered more important than providing annotations when demonstrating a live application or live desktop. However, annotations are valuable for collaboration and these examples of the system and method combine the advantages of presenting active or live content with the use of graphical annotations on a whiteboard. The embodiments described also maintain presentation flow while allowing graphic annotations to be made easily.

The snapshot control can be located in a shared application that is accessible to the presenter of the active application. Particularly, the user may desire to take snapshots of a currently active software application or software being demonstrated in the user interface. Accordingly, the snapshot control is located such that it will be available when the active application is being used. The snapshot control can be configured to remain on top or as a sidebar that will not be covered over by the active application.

Snapshots can be configured to take images of an active window, an active application, the entire presenter's desktop or a screen area that is defined by a presenter or user. For example, a user may be provided with a selection tool in order to select a portion of a screen where the snapshot is taken. However, taking a snapshot of either an active application or the entire desktop tends to provide more useful benefit for the user.

The snapshot control may be contained on or within a snapshot toolbar. The snapshot toolbar can include controls such as a snapshot button, a stop button, a pause button, and a resume button. The snapshot toolbar can reside on the desktop and be separate from the active application or snapshot target. In addition, the snapshot toolbar is configured to be available for use at anytime.

In addition to taking snapshots of active windows or the desktop, an embodiment of the system can also take snapshots of computer video, animations, and other image streams that are being displayed by the presenter. One particular benefit of the example embodiment is that it allows the presenter to seamlessly transfer snapshots of live video or active content directly to whiteboard sheets. As described before, this is valuable because using whiteboard functions is difficult when whiteboard use interrupts the flow of a presentation.

Figure 2:
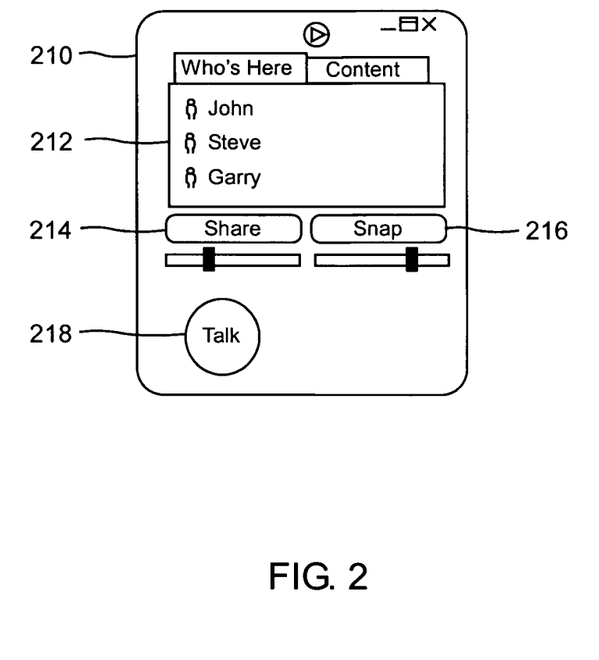
FIG. 2 illustrates a control screen for an application sharing and snapshot application in accordance with an embodiment.

FIG. 2 illustrates an embodiment of a collaboration or desktop sharing application 210 that enables collaborative electronic presentations. The sharing application illustrates a number of individual users 212 who are involved in the sharing session in the "Who's Here" tab. The sharing application includes a share button 214 to start sharing of active applications and a snapshot button 216 to launch the snapshot interface or toolbar. Audio connections are also available using the talk button 218.

Figure 3:
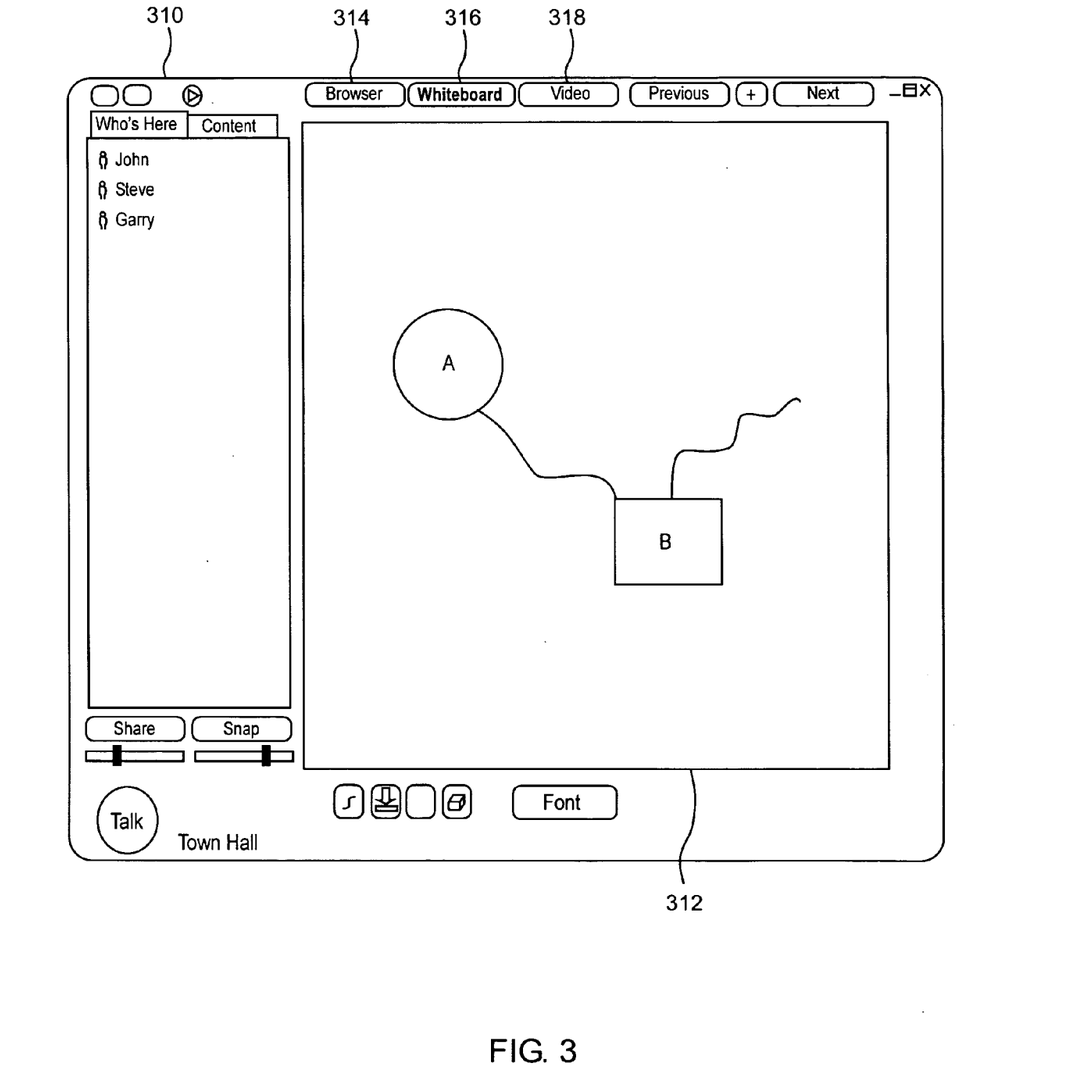
FIG. 3 depicts a whiteboard in accordance with an embodiment.

FIG. 3 illustrates a whiteboard 310 that can be provided to a user. The whiteboard may have a whiteboard area 312 with whiteboard sheets that can be annotated on by a user. In addition, the whiteboard includes a number of controls for switching back and forth between Internet browsing 314, whiteboard functions 316, and video 318.

In previous systems, the whiteboard is independent of the sharing functionality or structure. For example, a sharing application is an application or a browser plug-in that is used on a receiver's desktop. However, whiteboard applications do not generally interact with such sharing applications. If a presenter in a sharing environment desires to provide shared content to a group of recipients then that content resides in the sharing application. In contrast, if the presenter wants the receivers of the shared content to view a whiteboard, then each of users need to independently switch to that separate whiteboard application. Unfortunately, the presenter does not know if each receiver has the technical knowledge to switch between the sharing application and the whiteboard function or how long a switch might take. This uncertainty interrupts the flow of the presentation.

Figure 4:
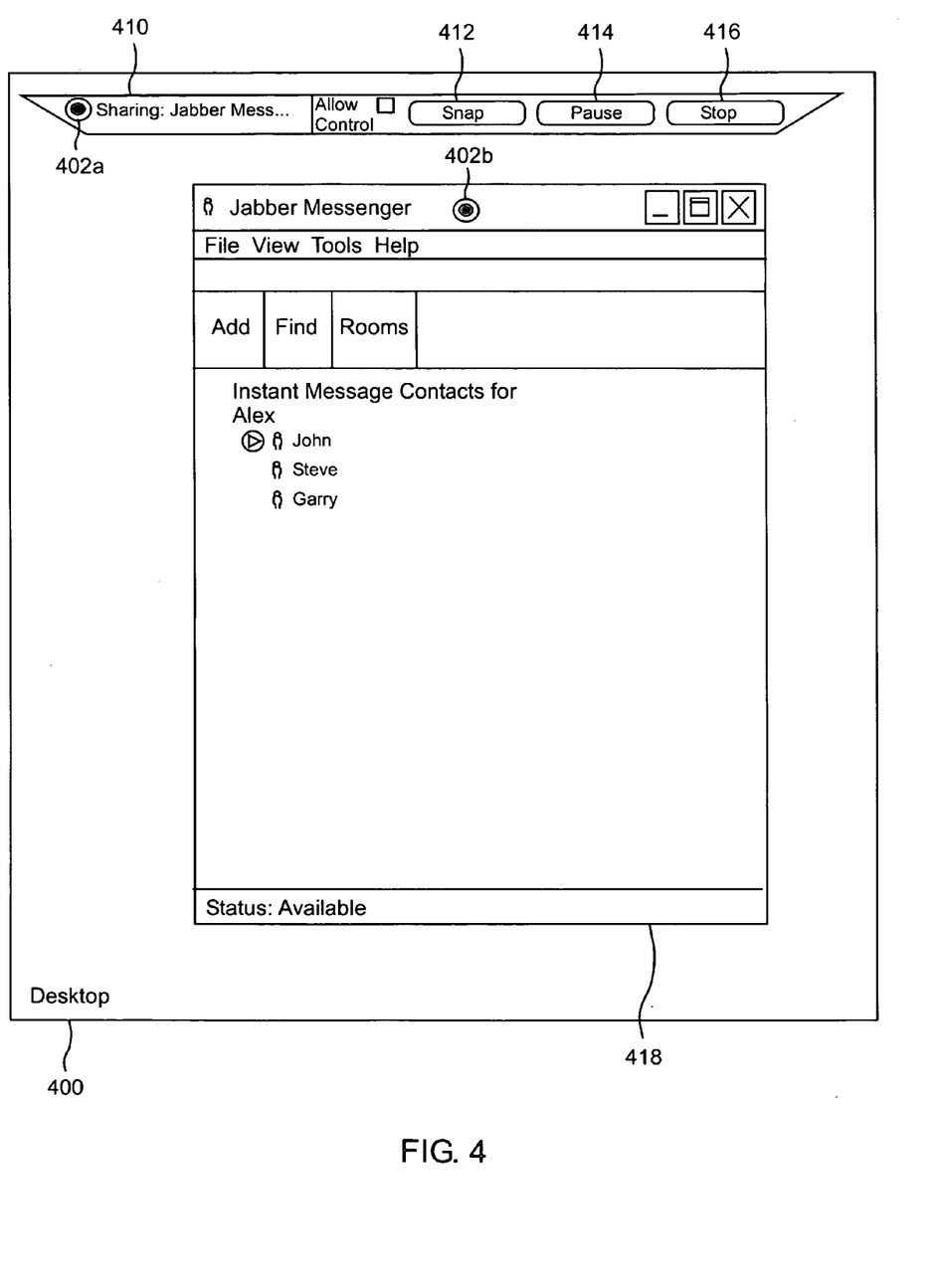
FIG. 4 illustrates an embodiment of a snapshot toolbar and an active application.

FIG. 4 illustrates part of a system for enabling a user to give an electronically shared presentation along with annotation of captured graphic information. Particularly, a shared desktop 400 is shown where electronic collaboration and media sharing can take place. An active application 418 or a "live" application is displayed on the desktop. For example, the active or live application can be a presenter's demonstration of an actual application in use by the presenter. The active application may be any type of application that can execute in a computing environment including a stand-alone, networked, graphical, non-graphical, or other type of software application.

In this example, an instant messaging application 418 is illustrated as being shared. The link between the application and the snapshot control 412 is denoted by the dot on each of the applications as 402*a* and 402*b*. A snapshot toolbar 410 is included to provide a snapshot interface to the user. The snapshot toolbar may include a pause control 414 and a stop control 416. This snapshot toolbar is separate from the active application so that the toolbar can be placed on top of the active application or moved around as desired by the user. A snapshot control 412 or button is configured to initiate a snapshot of the shared application. In the illustration of FIG. 4, the shared application is an active application 418. However, the shared application for the snapshot may be defined as the entire user desktop or a custom area selected by the user.

Figure 5:
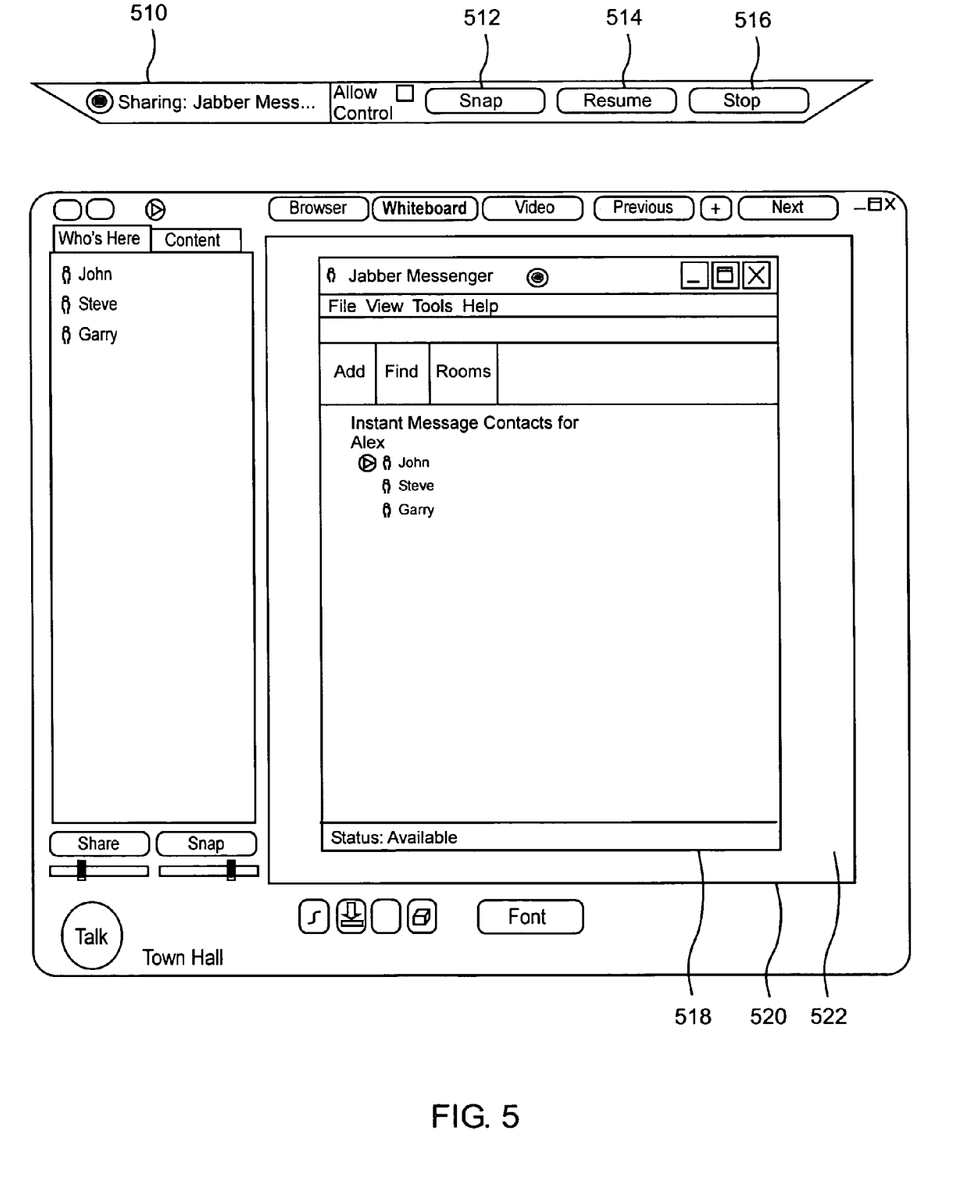
FIG. 5 illustrates a snapshot as displayed in a whiteboard used in an embodiment.

FIG. 5 illustrates what happens when a snapshot is taken. A whiteboard 520 is provided that is linked to the snapshot control. The whiteboard includes a whiteboard annotation area 522 that can display the snapshots 518 received from the snapshot control 512. The snapshot toolbar 510 may include the snapshot control, a pause control 414, and a stop control 416. These snapshots are transferred directly from the snapshot control to the whiteboard sheets of the whiteboard via the software link upon the single clicking of the snap button. This means that no additional user action needs to be taken to send the information to the whiteboard sheets.

Figure 6:
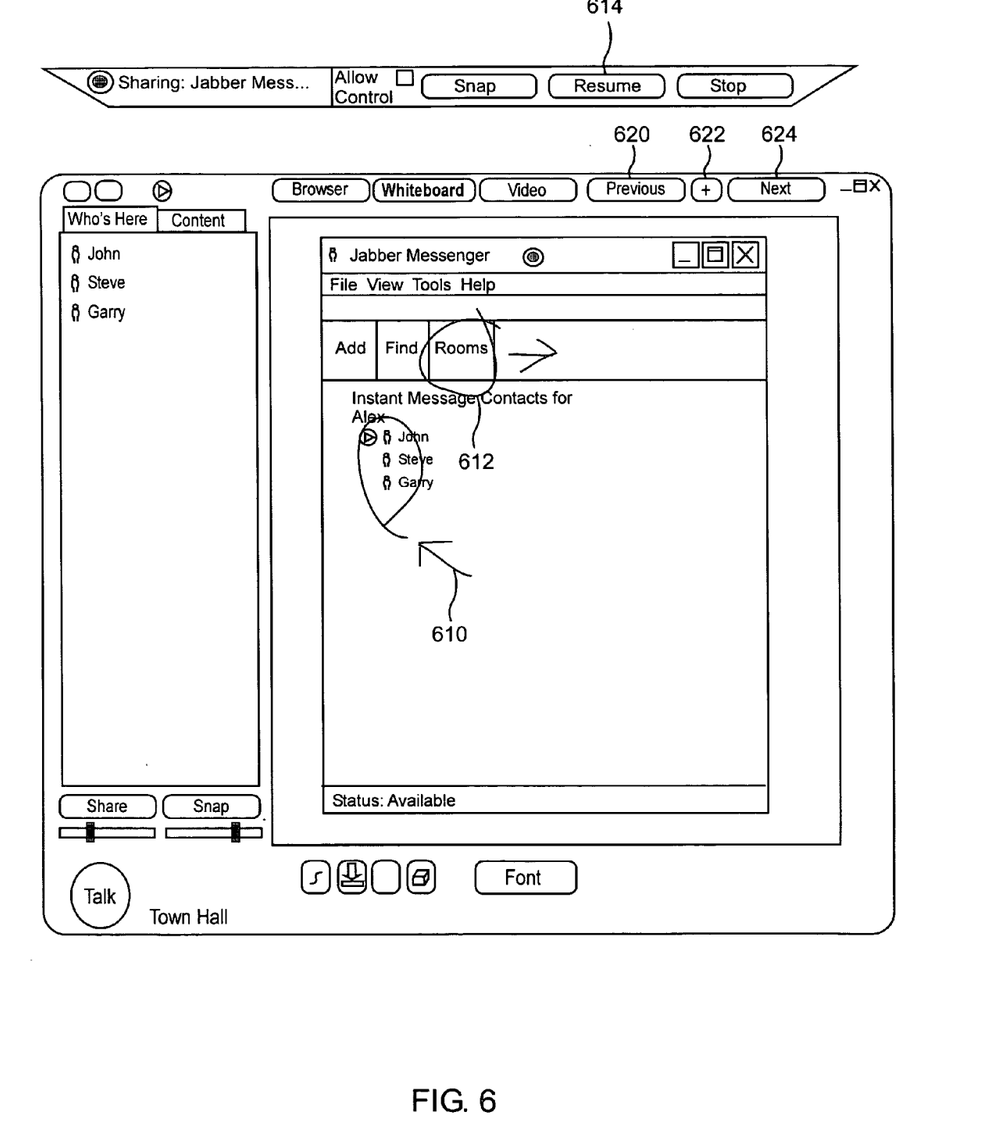
FIG. 6 illustrates an annotated snapshot as displayed in a whiteboard in an embodiment.

FIG. 6 further illustrates that annotations using free hand or other graphics tools can be made on the snapshot in the whiteboard sheet. In the example of FIG. 6, annotations 610, 612 have been made by the presenter and/or receivers of the shared application to provide feedback for a presenter. For example, one annotation 612 may indicate that a certain button should be moved over, expanded, or changed. In addition, another annotation 610 may indicate that larger icons should be used in the application.

Once the annotation is complete, the resume control 614 can be used to immediately resume the activity of the active program and hide, close, or send the whiteboard behind other windows. The resume control can return the active application's state to the state before the snapshot was taken. An example of this would be FIG. 6 returning to the state illustrated in FIG. 4.

FIG. 6 further illustrates that navigation buttons for the plurality of whiteboard sheets can be provided. A next button 624 can be provided for moving through the whiteboard sheets in increasing numerical order or in the order the snapshots were taken in time. A previous button 620 can be provided for navigating backward through the whiteboard sheets. Additional buttons 622 can be provided with functionality for the whiteboard sheets. For example, the additional buttons may be programmed for zooming in or zooming out of a whiteboard sheet. Alternatively, the button may open a dialog box that allows the user to move through the whiteboard sheets by numerical text entries and the user may specify the whiteboard sheet number desired to be viewed (e.g., the user can enter the number 10 to view whiteboard sheet number 10).

Figure 7:
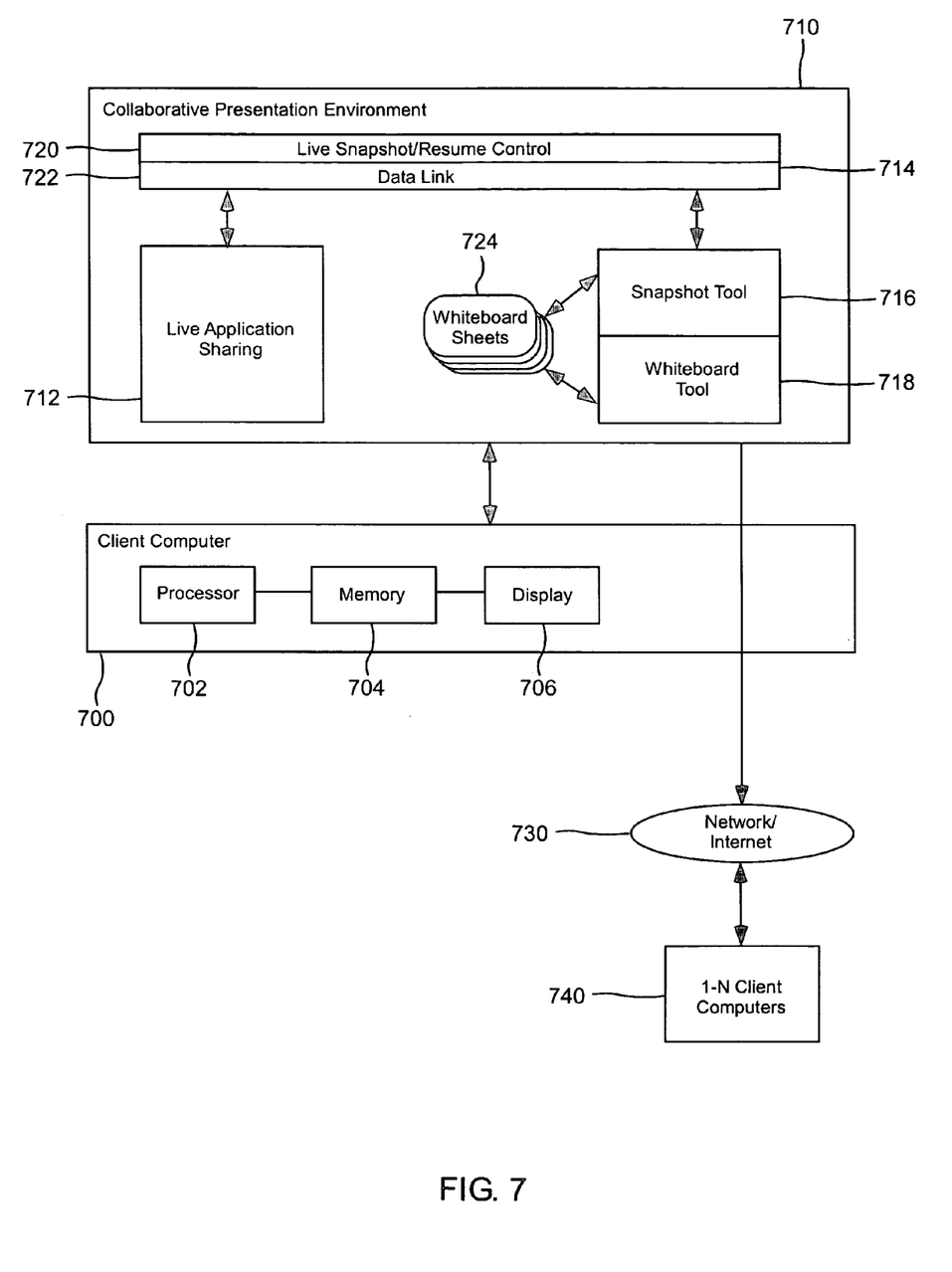
FIG. 7 is a block diagram illustrating an embodiment of a system for enabling a user to give a presentation of a live application using collaboration software and whiteboard sheets from the live application presentation.

FIG. 7 is a block diagram illustrating a system for enabling a user to give a presentation of a live application using collaboration software and to annotate captured graphic information from the live application presentation. A collaborative presentation environment 710 can be executing on a client computer 700.

The client computer 700 may include a processor 702, an electronic memory 704, a display device 706, and other related systems. In addition, the client computer can connect to a computer network or the Internet 730. This network connection allows the client computer to connect to any number of additional client computers 740 which have the collaborative presentation environment executing on them.

The collaborative presentation environment may contain a snapshot tool 716 that allows the user of the client computer to take a snapshot of an active application or desktop and send the snapshots to a whiteboard tool 718 and also to whiteboard sheets 724 for annotation. A live application sharing module 712 is provided that allows the presenter to share a live application with many other users of the collaborative presentation tool over the network while the live application is executing.

A live snapshot control/resume control 720 functioning as a live snapshot control is configured to initiate a snapshot of a live shared application. This snapshot may be automatically transferred to the whiteboard through the data link 722 and 714 between the live application sharing tool and the whiteboard. Then the snapshot can be stored in one of a plurality of whiteboard sheets 724. User navigation functions for the whiteboard sheets can also be provided with a forward and back navigation button or other functions as described previously. The whiteboard may be configured to display snapshots received from the snapshot control in the whiteboard sheet format after the snapshot control has been initiated.

In addition, the live snapshot control/resume control 720 functioning as a resume control is configured to resume activity of the shared application, then the focus may be returned to the background and the live application sharing may resume center focus. For example, the resume control may be a resume button that is dynamically displayed on a snapshot toolbar when the snapshot is being displayed in the whiteboard. The live snapshot control and resume control can be contained in a toolbar to provide a live application snapshot interface to the user.

In one embodiment, the resume button is not displayed before the snapshot is taken. The resume button is then provided after the snapshot is taken to allow the user or presenter to hide the whiteboard and return to the sharing mode. This resume button configuration allows the presenter and the receivers of the shared content to return to the active application or active content in one operation. In addition, the resume button can hide or close the whiteboard without any additional user intervention, even though the whiteboard is a separate application from the sharing application. Alternatively, the resume button can be continuously displayed in the toolbar and enabled when the button's functionality is available.

Although the snapshot toolbar is illustrated as having snapshot and resume controls that are buttons, other types of user interface controls might be used. For example, the snapshot control may be a hyperlink, menu, dropdown list, or some other user control that can start the snapshot process and send the snapshot immediately to the whiteboard. Of course other applications, windows, or displayed information may also be presented by the computing environment along with the active application and any snapshot may include this additional information if desired.

One valuable result of the present embodiment is that the individual giving a presentation using desktop sharing or electronic collaboration tools does not need to be preoccupied with the snapshot tool when they desire to provide annotations of an active application. Using a snapshot that goes directly to the whiteboard sheets via a link and brings the whiteboard to the front focus, enables the user to push one button to start making annotations without interrupting the flow of the presentation. Then when the annotation is complete, the user can return to the original active application, video, or other active content. Previous methods of desktop sharing have allowed a desktop snapshot to be taken, but there has been no method to automatically send the snapshot to any other tool or whiteboard.

In the past, users who wanted to view the whiteboard during a collaborative presentation session have had to shut down the application sharing functions in order to use the snapshot and whiteboard tools in the collaborative environment. This means that a presenter may be giving a presentation to valuable clients or hundreds of viewers for a live shared application but if the presenter wants to annotate a snapshot of the application, then the application sharing has to be shutdown and the recipients cannot see the live application. Then the audience will wait until the snapshots are taken and annotated on the whiteboard before the live application sharing is restarted and the audience can see the live shared application again. In contrast, one reason this exemplary system and method are beneficial is because it allows presenters to make snapshots of live applications without shutting down the application sharing component. Then the snapshots from the live application can be sent to a whiteboard where edits or annotations can be immediately made. Then interface allows the presenter to quickly resume back to the original presentation and live application sharing with a single interface control action.

While the forgoing examples are illustrative of the embodiments of the present system and method in one or more particular applications, it will be apparent to those of ordinary skill in the art that numerous modifications in form, usage and details of implementation can be made by one skilled in the art, and without departing from the principles and concepts of the invention. Accordingly, it is not intended that the invention be limited, except as by the claims set forth below.

The invention claimed is:

1. A method for enabling collaborative electronic presentations and annotation of graphic information on a first client computer connected to a computer network, comprising:
   in response to an action by a user through a user accessible snapshot control on said first client computer running a collaborative sharing environment, performing a series of actions without additional user input, the series of actions comprising:
      taking a snapshot of an active application;
      transferring the snapshot of the active application to an electronic whiteboard;
      storing the snapshot in a new whiteboard sheet of the electronic whiteboard;
      displaying the new whiteboard sheet of the electronic whiteboard on the first client computer;
      enabling graphical annotation of the new whiteboard sheet by the user;
      providing the electronic whiteboard to a second client computer for display; and
      displaying a resume control, wherein the resume control is not visible when the active application is being displayed.

2. A method as in claim 1, further comprising navigating between whiteboard sheets using user accessible next and previous controls.

3. A method as in claim 1, wherein displaying the new whiteboard sheet on a first client computer includes moving the whiteboard to a foreground and setting the whiteboard as the active application.

4. A method as in claim 1, further comprising linking the snapshot control to an electronic whiteboard to provide communication between the snapshot control and the electronic whiteboard.

5. A method as in claim 1, wherein taking a snapshot of an active application further comprises the step of taking a snapshot of the active application and the user's graphical desktop in a computer interface.

6. A method as in claim 1, wherein taking a snapshot of an active application further comprises the step of taking a snapshot of an active application as defined by the user.

7. A method as in claim 1, further comprising using the snapshot control with a snapshot toolbar that includes the snapshot control, a resume control, and a control for navigating through whiteboard sheets.

8. A method as in claim 1, further comprising using application sharing to provide the collaborative electronic presentations.

9. A method as in claim 1, wherein taking a snapshot of a portion of an active application, further comprises enabling the user to take a snapshot of a video stream.

10. A method for facilitating collaborative electronic presentations and annotation of graphic information on an electronic whiteboard on a first client computer connected to a computer network, comprising:
   while running a first application comprising a snapshot control and the electronic whiteboard and a second application sharing content from said first client computer, in response to a first user activation of a snapshot control performing a series of actions without additional user action, the series of actions comprising:
      taking a snapshot of content currently being shared by said first client computer;
      transferring the snapshot to the electronic whiteboard;
      storing the snapshot in a whiteboard sheet of the electronic whiteboard;
      enable annotation of the whiteboard sheet in the electronic whiteboard; and
      providing the electronic whiteboard to a second client computer for display and
   in response to a second user activation of the snapshot control, performing a series of actions without additional user action, the series of actions comprising:
   hiding the electronic whiteboard;
   restoring a view of the second application; and
   sharing the second application.

11. A method as in claim 10, wherein the second user activation of the snapshot control is activating a resume button.

12. A system for enabling a user to give an electronic presentation and annotate captured graphical information, comprising:

a snapshot control implemented by a first client computer including a processor configured to initiate a snapshot of an active application with said first client computer while an execution of said active application by said first client computer is concurrently shared live over a computer network through a collaborative presentation environment;

a whiteboard linked to the snapshot control, the whiteboard being configured to display snapshots received from the snapshot control, the whiteboard being configured to display snapshots received from the snapshot control when the snapshot control is initiated, the whiteboard replacing the active application being shared over a computer network;

a plurality of whiteboard sheets controlled by the whiteboard, wherein each snapshot received from the snapshot control is stored in a separate whiteboard sheet, the snapshot control including a button to change the displayed whiteboard sheet to a different whiteboard sheet; and a resume control configured to cause the first client computer, in response to a user activation of the resume control and without additional user input, to resume sharing the active application, to hide the whiteboard, and to restore the active application to focus for use by a user.

13. A system as in claim 12, further comprising next and previous buttons configured to allow user navigation of the whiteboard sheets.

14. A system as in claim 12, further comprising a snapshot toolbar to provide a snapshot interface to the user.

15. A system as in claim 12, wherein the snapshot control is a snapshot button located in a snapshot toolbar.

16. A system as in claim 12, wherein the resume control is a resume button that is dynamically displayed on a snapshot toolbar when a snapshot is being displayed in the whiteboard.

17. A system as in claim 12, wherein the whiteboard is configured to allow graphical annotation of the plurality of whiteboard sheets in the whiteboard annotation area for the user.

18. A system as in claim 12, wherein snapshot control is configured by a user to take a snapshot of a portion of a computer interface.

19. A system for enabling a user to give an electronic presentation and annotate captured graphical information comprising:

a first client computer coupled to a computer network, said first client computer comprising a processor configured to implement a snapshot toolbar in a user interface, the snapshot toolbar comprising a set of components that perform described operations upon selection without additional user input, the set of components comprising:

a snapshot control which:
captures a snapshot of content being shared by a first application;
transfers active control to a whiteboard;
copies the snapshot into the whiteboard;
brings the whiteboard to the front of a user interface
shares the whiteboard; and
enables editing tools in the whiteboard and a resume control which:
hides the whiteboard;
restores active control to the first application; and
shares the first application.

20. A system as in claim 19, wherein the snapshot toolbar further comprises a button allowing user navigation between whiteboard pages.

21. An article of manufacture including a computer usable medium having computer readable program code embodied therein for enabling collaborative electronic presentations and annotation of graphic information on a first client computer connected to a computer network, comprising computer readable program code capable of performing the operations of:

in response to user activation of a snapshot control, performing a series of operations without additional user input, the series of operations comprising:
taking a snapshot of an active application while an execution of said active application by said first client computer is concurrently being shared live over said computer network;
transferring the snapshot of the active application to an electronic whiteboard;
storing the snapshot in a whiteboard sheet of the electronic whiteboard, wherein each loaded snapshot is stored in a separate whiteboard sheet in order to provide a plurality of whiteboard sheets;
enabling graphical annotation of the plurality of whiteboard sheets in a whiteboard annotation area for the user; and
sharing the electronic whiteboard over said computer network, and in response to user activation of a return control, performing a series of operations without additional user input, the series of operations comprising:
resuming activity of the active application; and
restoring the active application to focus for use by the user.

* * * * *